(12) United States Patent
Ahuja et al.

(10) Patent No.: US 10,234,833 B2
(45) Date of Patent: Mar. 19, 2019

(54) TECHNOLOGIES FOR PREDICTING POWER USAGE OF A DATA CENTER

(71) Applicant: Intel Corporation, Santa Clara, CA (US)

(72) Inventors: Nishi Ahuja, University Park, WA (US); Rahul Khanna, Portland, OR (US); Abishai Daniel, Beaverton, OR (US); Zhijie Sheng, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 88 days.

(21) Appl. No.: 15/396,012

(22) Filed: Dec. 30, 2016

(65) Prior Publication Data

US 2018/0024578 A1    Jan. 25, 2018

Related U.S. Application Data

(60) Provisional application No. 62/378,168, filed on Aug. 22, 2016, provisional application No. 62/365,969, filed on Jul. 22, 2016, provisional application No. 62/376,859, filed on Aug. 18, 2016, provisional application No. 62/427,268, filed on Nov. 29, 2016.

(51) Int. Cl.
| | | |
|---|---|---|
| *G05D 23/19* | (2006.01) | |
| *G05B 13/02* | (2006.01) | |
| *G06F 1/20* | (2006.01) | |

(52) U.S. Cl.
CPC ......... *G05B 13/0265* (2013.01); *G06F 1/206* (2013.01)

(58) Field of Classification Search
CPC .................. G05D 23/1917; G05B 13/0265
See application file for complete search history.

(56) References Cited

U.S. PATENT DOCUMENTS

| | | | | |
|---|---|---|---|---|
| 8,397,088 | B1* | 3/2013 | Ghose | G06F 1/3206 |
| | | | | 713/300 |
| 9,960,637 | B2* | 5/2018 | Sanders | H02J 3/381 |
| 2006/0259621 | A1* | 11/2006 | Ranganathan | G06F 1/206 |
| | | | | 709/226 |
| 2009/0228726 | A1* | 9/2009 | Malik | G06F 1/3203 |
| | | | | 713/320 |
| 2010/0235654 | A1* | 9/2010 | Malik | G06F 1/3209 |
| | | | | 713/300 |
| 2012/0016526 | A1* | 1/2012 | Burton | F24F 11/0012 |
| | | | | 700/278 |
| 2015/0121113 | A1* | 4/2015 | Ramamurthy | H02J 9/061 |
| | | | | 713/340 |
| 2015/0192978 | A1* | 7/2015 | Ghose | G06F 1/3206 |
| | | | | 713/323 |

(Continued)

*Primary Examiner* — Ramesh B Patel
(74) *Attorney, Agent, or Firm* — Barnes & Thornburg LLP

(57) ABSTRACT

Technologies for predicting the power usage of a data center are disclosed. A data center manager gathers sensor data from the compute devices of the data center. The sensor data indicates factors such as power used by the compute device and the intake air inlet temperature. The data center manager trains a machine-learning-based algorithm based on training sensor data, and then applies the machine-learning-based algorithm to sensor data as it is being gathered. The machine-learning-based algorithm can predict a change in future power usage of the data center, and control a cooling unit to compensate before the power usage even begins to change.

25 Claims, 16 Drawing Sheets

(56) References Cited

U.S. PATENT DOCUMENTS

| | | | | |
|---|---|---|---|---|
| 2015/0301572 A1* | 10/2015 | Zhou | ................ | G06F 1/3203 |
| | | | | 713/320 |
| 2017/0005515 A1* | 1/2017 | Sanders | ................ | H02J 3/381 |
| 2017/0085637 A1* | 3/2017 | Cencini | ................ | H04L 67/1042 |
| 2017/0109205 A1* | 4/2017 | Ahuja | ................ | G06F 9/505 |

* cited by examiner

TECHNOLOGIES FOR PREDICTING POWER USAGE OF A DATA CENTER

CROSS-REFERENCE TO RELATED APPLICATIONS

The present application claims the benefit of U.S. Provisional Patent Application No. 62/378,168, filed Aug. 22, 2016, U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016.

BACKGROUND

Data centers may contain a large number of compute devices in a relatively small area, and the total power used by the compute devices is often high enough to require active cooling of the data center to prevent overheating, such as through an air conditioning unit. If the temperature of the data center is too hot, the components of the compute devices may overheat, causing damage or premature failure. If the air conditioner is run at full capacity all of the time, the temperature of the data center may be lower than necessary, which may be a waste of resources.

The compute devices in a data center may not always be run at maximum capacity, and so the heat generated by the compute devices may vary over time. For example, several users of the data center may begin tasks at about the same time, and those tasks may be completed at about the same time. As a result, the cooling required may vary over time as well.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
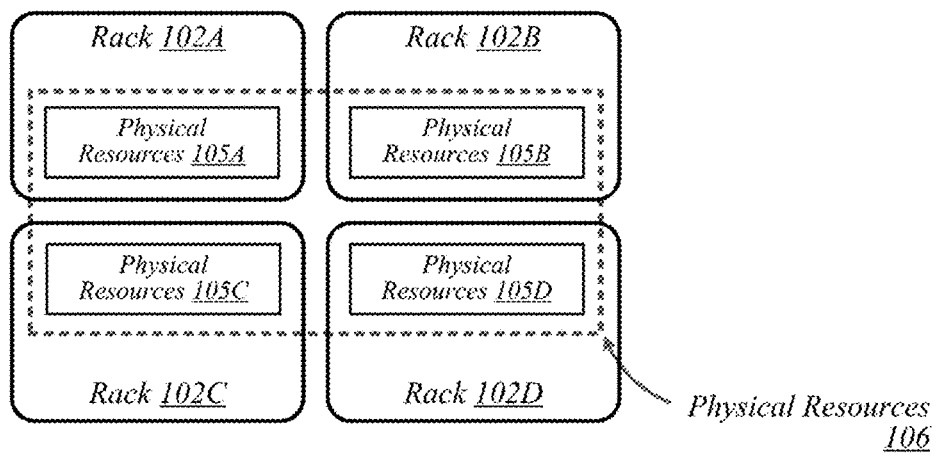
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as Dual In-line Memory Modules (DIMMs), are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, Application Specific Integrated Circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
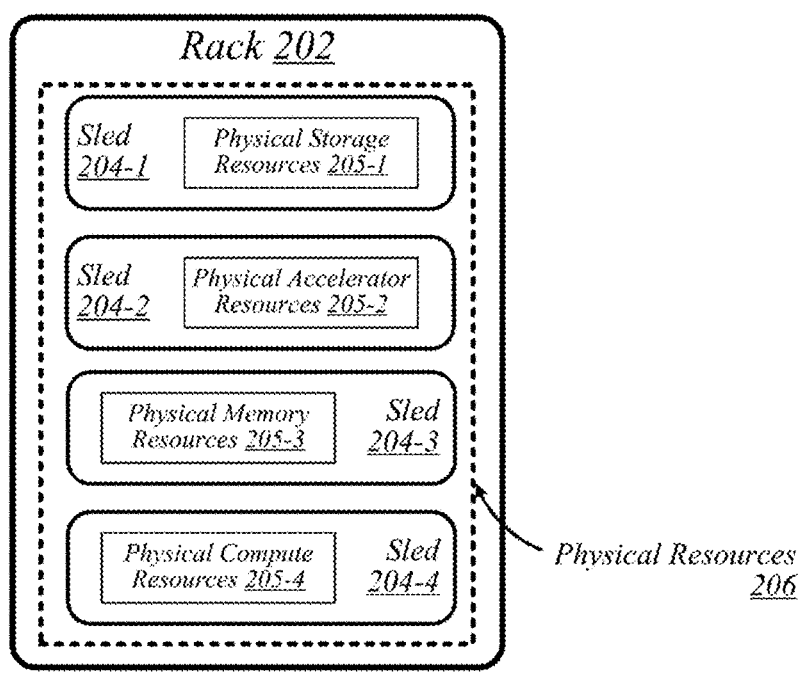
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
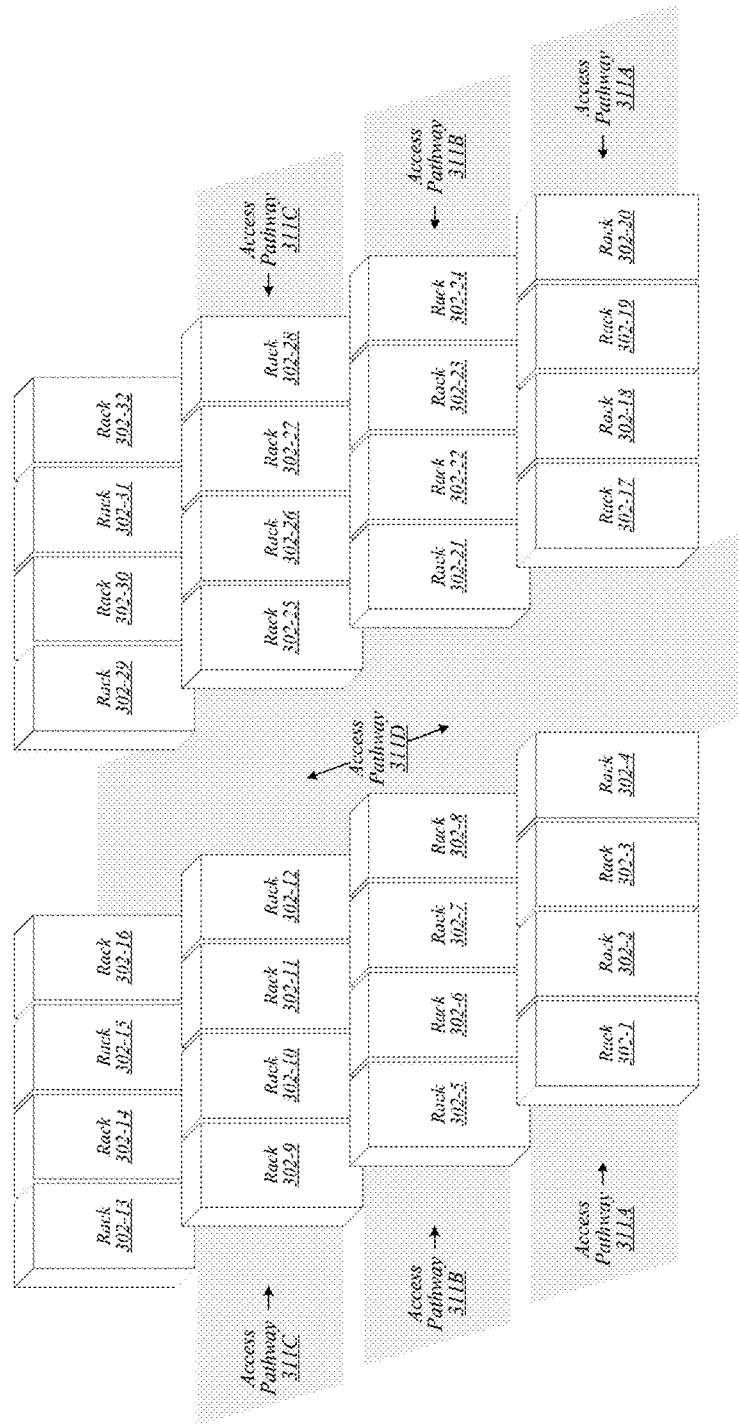
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
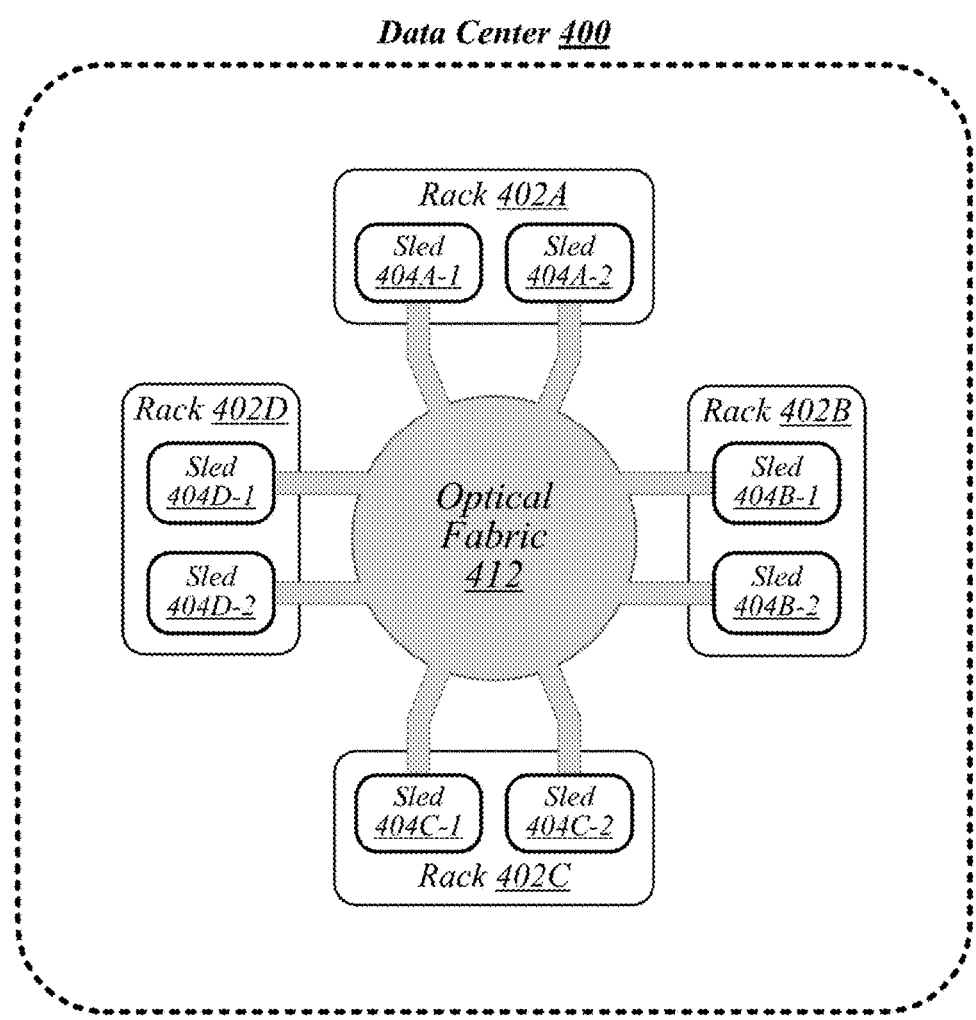
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
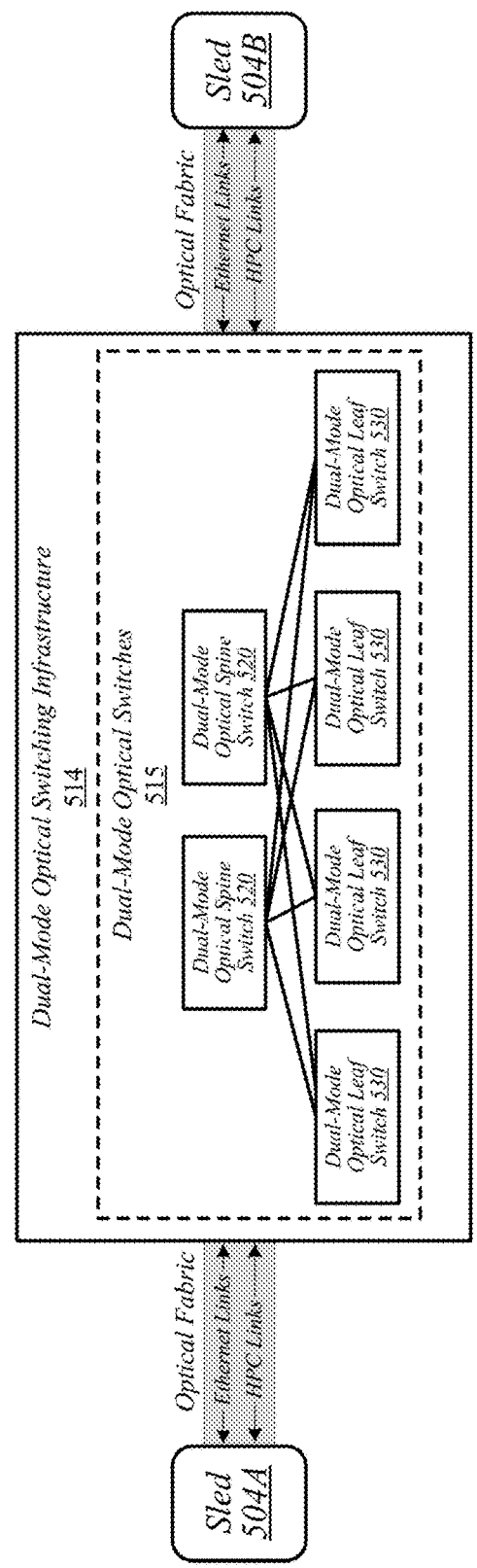
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
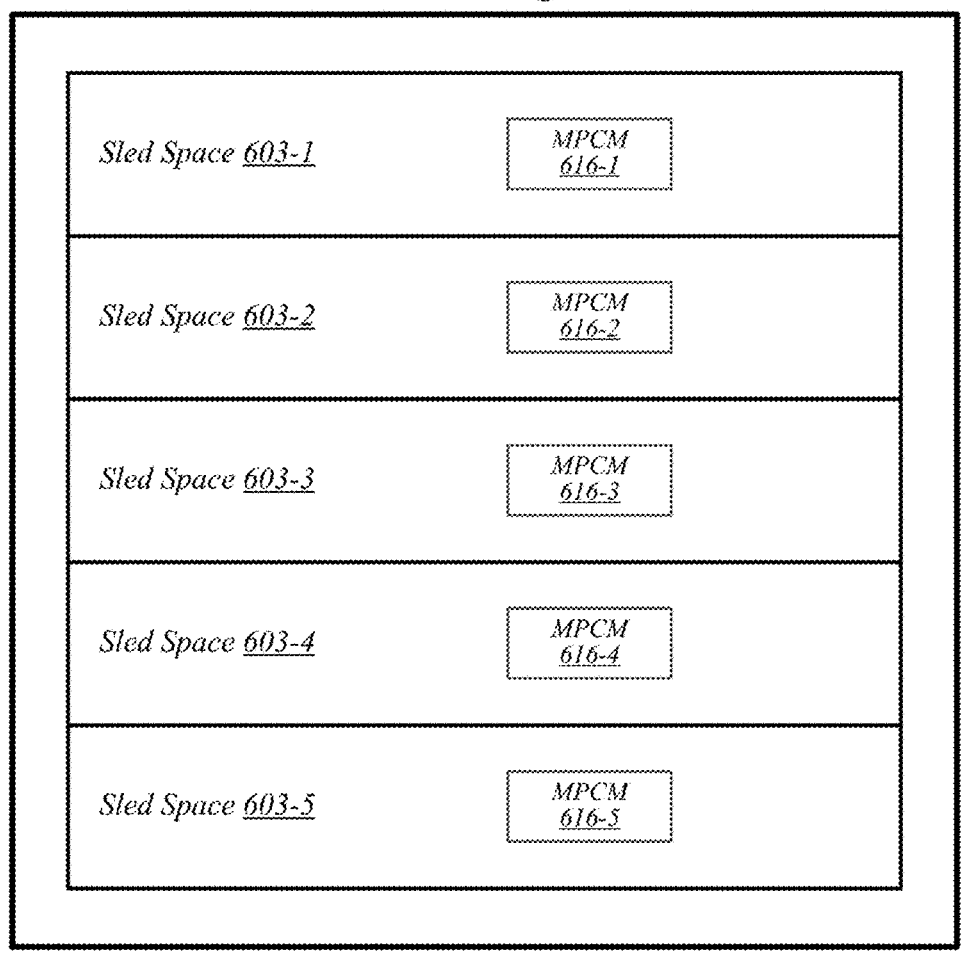
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
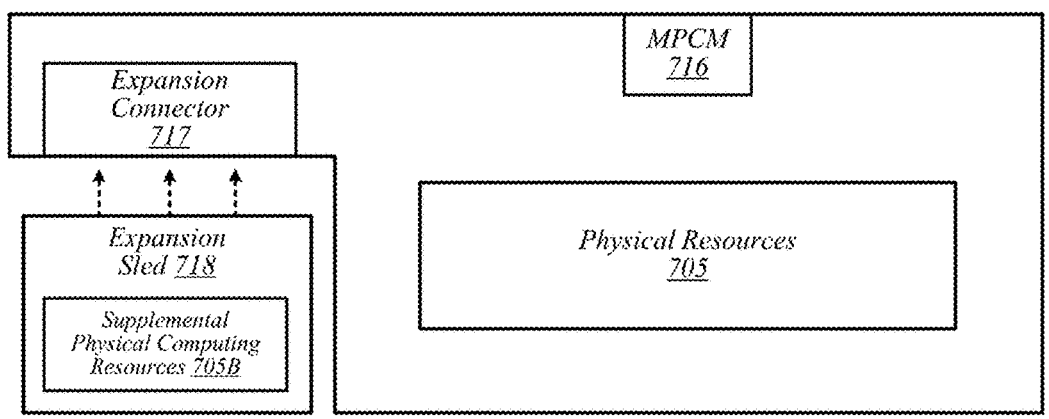
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
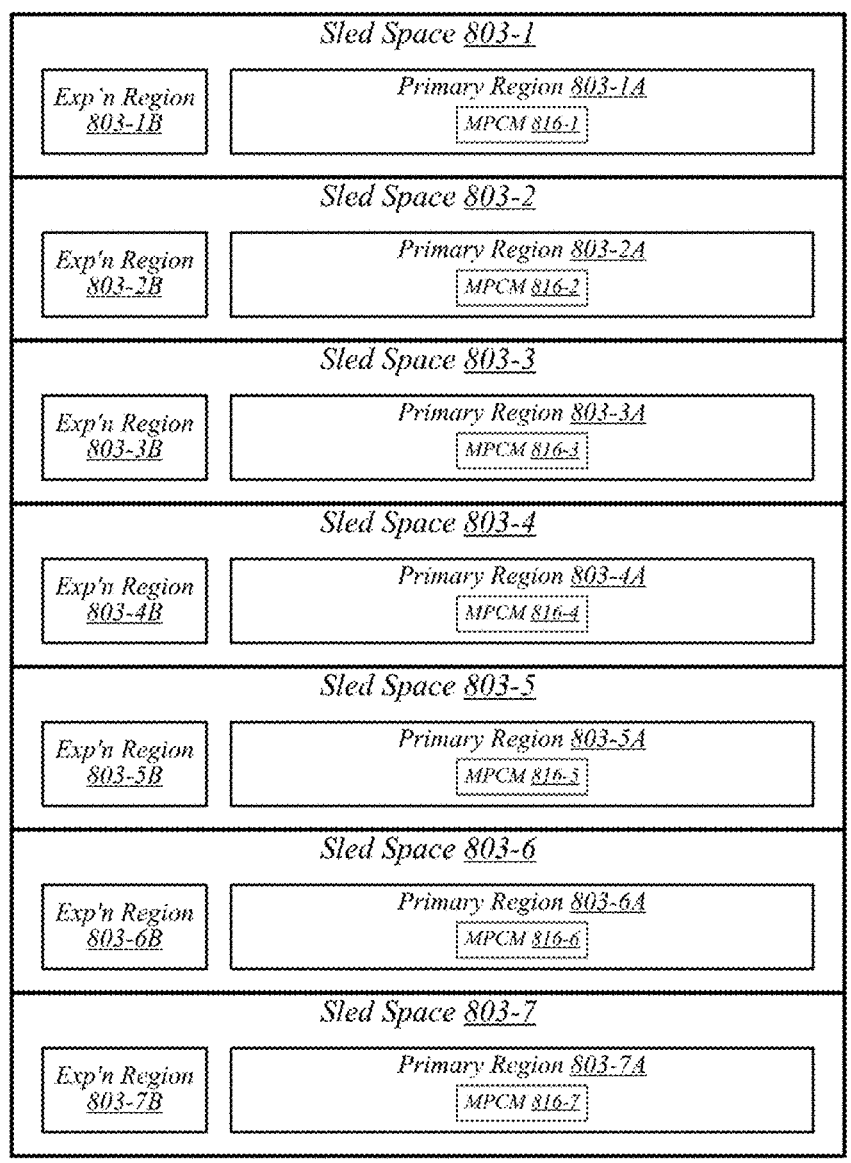
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
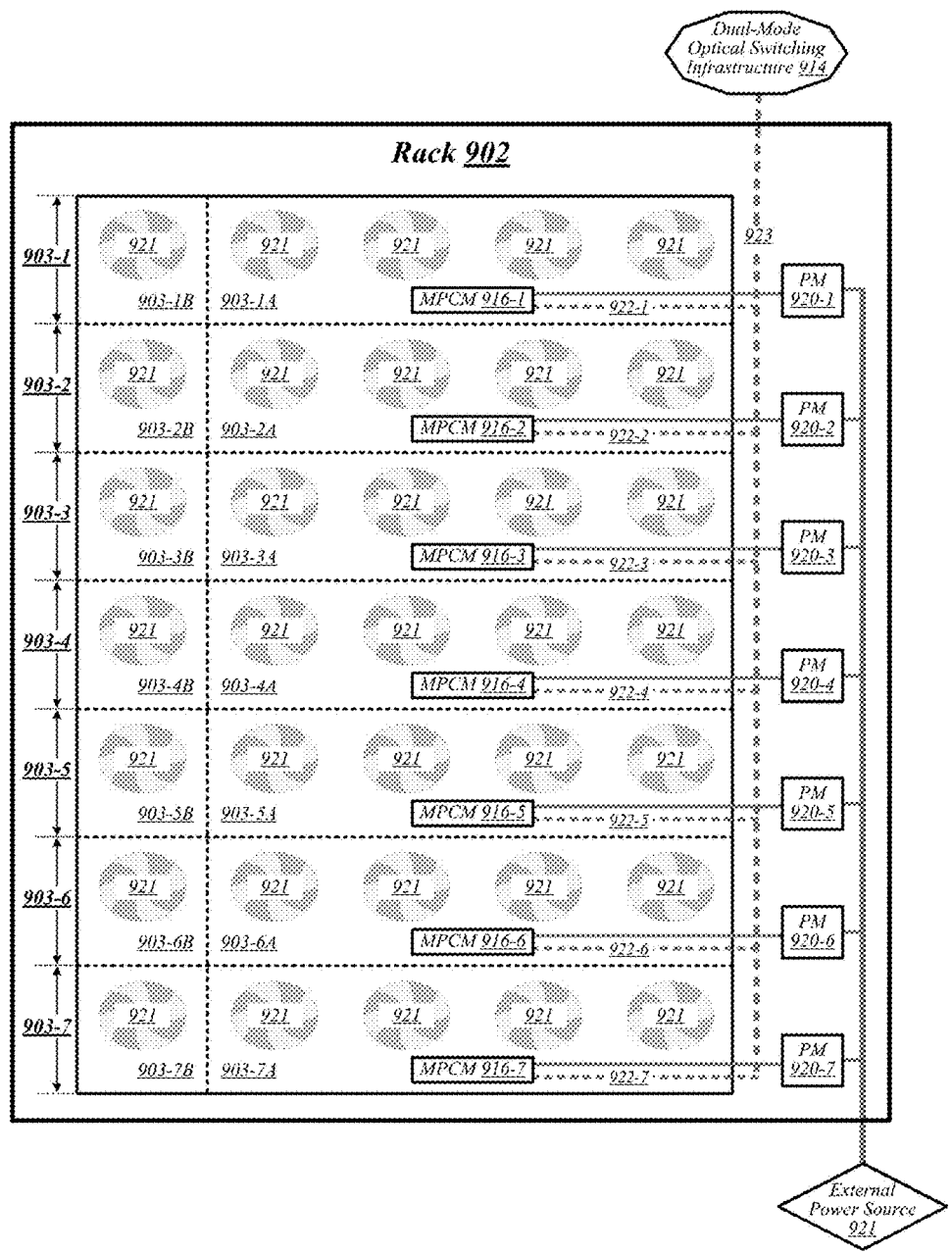
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
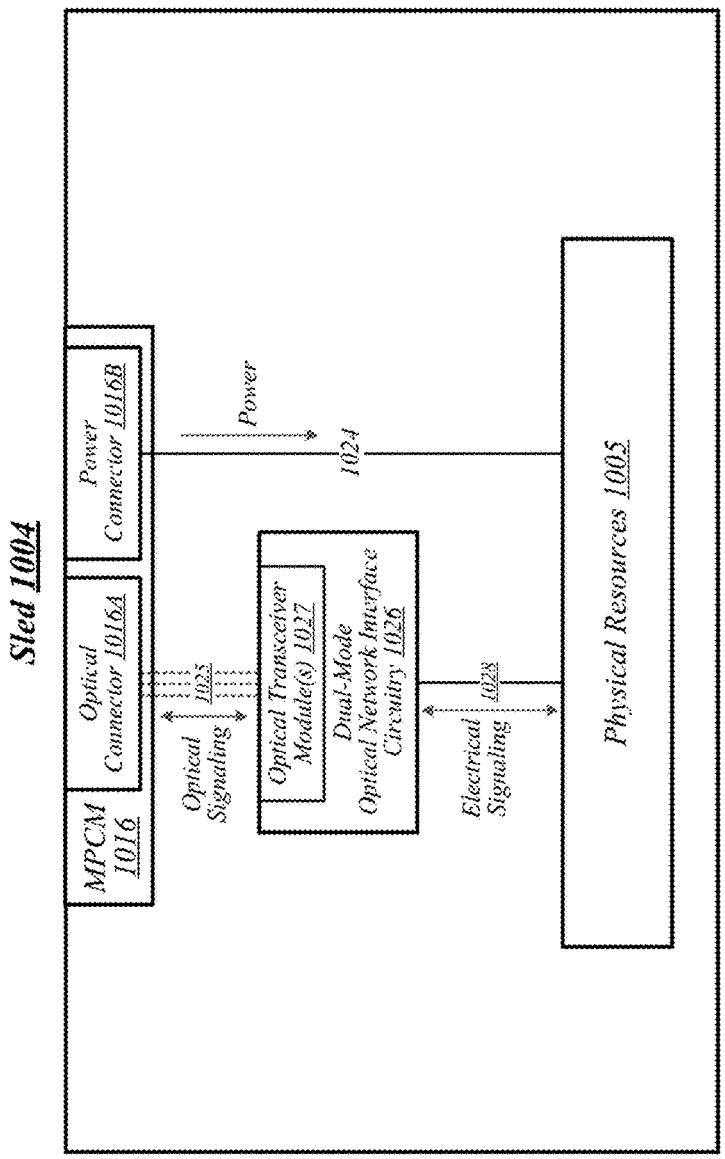
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heat pipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
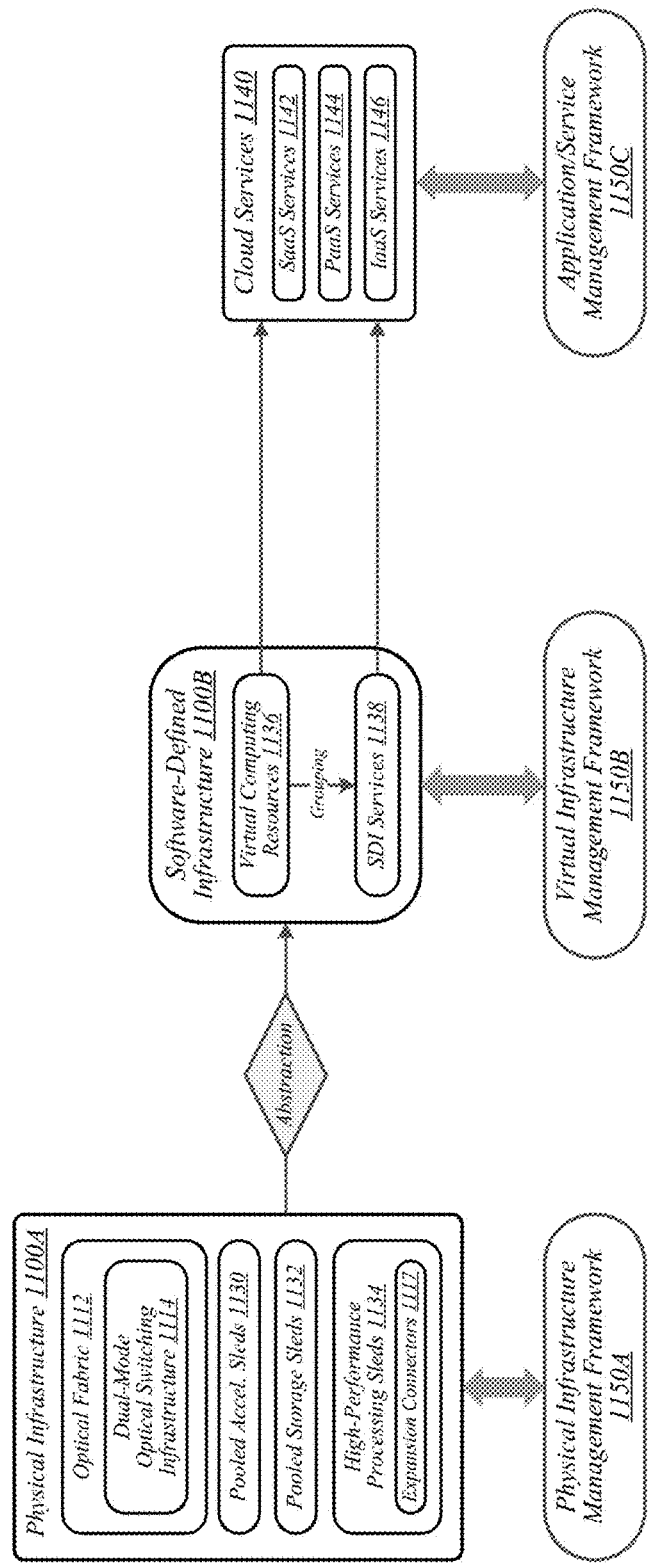
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
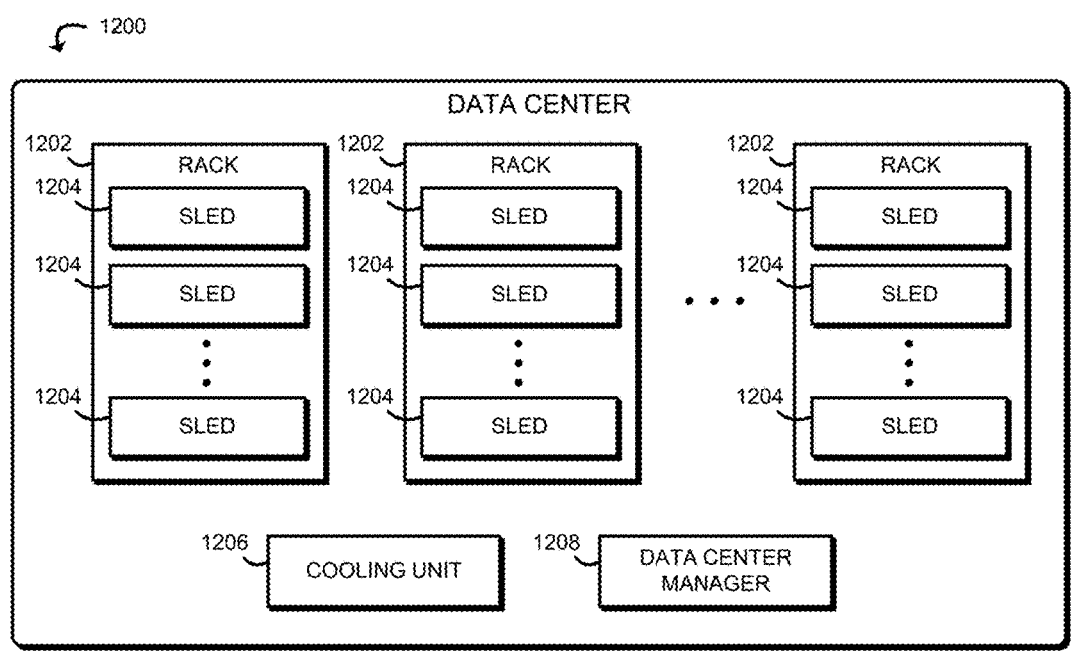
FIG. 12 is a simplified block diagram of at least one embodiment of a data center including several compute devices with a data center manager for predicting power usage of the data center.

Referring now to FIG. 12, an illustrative data center 1200 includes a data center manager 1208, which is configured to manage certain aspects of the operation of the data center 1200, including operation of a cooling unit 1206. In use, the data center manager 1208 receives sensor data from telemetry sensors from the sleds 1204. The data center manager 1208 predicts, based on the sensor data and a machine-learning-based algorithm, an expected power usage at the node, sled, rack, and data center level for the near future, such as for the next 15 minutes. The data center manager 1208 may control the cooling unit 1206 to adjust to the anticipated cooling load based on the predicted power usage. Such adjustments may be particularly useful in embodiments in which there is a time lag between changing a parameter of the cooling unit 1206 and when the air entering the sleds 1204 reaches the desired temperature.

The data center 1200 may be embodied as any building, room, or other facility which includes several sleds 1204 that use enough power to significantly affect a temperature in the data center 1200. The illustrative data center 1200 includes several racks 1202, each of which includes several sleds 1204. The racks 1202 may be lined up in one or more rows. It should be appreciated that some embodiments may arrange the sleds 1204 differently. For example, some embodiments of the data center 1200 may not have the sleds 1204 arranged in racks. Of course, the data center may include many components not shown in FIG. 12, such as networking equipment to connect all of the sleds 1204.

An illustrative sled 1204 may be embodied as any type of compute device capable of performing the functions described herein. For example, the sled 1204 may be embodied as or otherwise be included in, without limitation, a blade server computer, a server computer, a desktop computer, an embedded computing system, a System-on-a-Chip (SoC), a smartphone, a cellular phone, a tablet computer, a notebook computer, a laptop computer, a wearable computer, a handset, a messaging device, a camera device, a multiprocessor system, a processor-based system, a consumer electronic device, and/or any other computing device. In some embodiments, the individual components of any given sled 1204 may be on different racks 1202, and the individual components that compose a sled 1204 may be logically reconfigurable without physically changing the configuration of any hardware. Of course, in some embodiments, the sled 1204 may be embodied as a sled 704 as shown in FIG. 7 or a sled 1004 as shown in FIG. 10 with any modifications that may be necessary to perform the function described herein.

The cooling unit 1206 may be any type of cooling unit capable of absorbing or removing heat from the data center 1200. For example, the cooling unit 1206 may be embodied as an air conditioner, a heat exchanger, or an air handler. The cooling unit 1206 has some adjustable configuration allowing the cooling capacity of the cooling unit 1206 to change, such as a duty cycle, a chilled water flowrate, a fan speed on a cooling coil, a fan speed on an exhaust coil, a parameter of operation of a compressor or condenser, etc.

Like the sled 1204, the data center manager 1208 may be embodied as or otherwise be included in, without limitation, a blade server computer, a server computer, a desktop computer, an embedded computing system, a System-on-a-Chip (SoC), a smartphone, a cellular phone, a tablet computer, a notebook computer, a laptop computer, a wearable computer, a handset, a messaging device, a camera device, a multiprocessor system, a processor-based system, a consumer electronic device, and/or any other computing device. In some embodiments, the data center manager 1208 may be one of the sleds 1204 in a rack 1202 of the data center 1200, and in other embodiments, may be a separate or isolated compute device, such as in a control room of the data center 1200. In some cases, the data center manager 1208 may not even be physically at the same location as the data center 1200.

Figure 13:
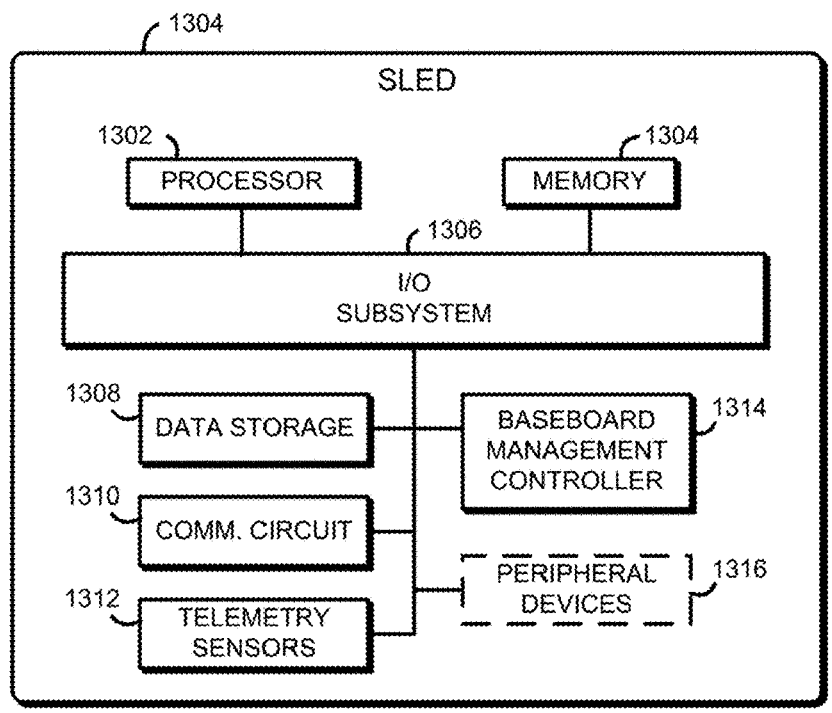
FIG. 13 is a simplified block diagram of at least one embodiment of a compute device of the data center of FIG. 12.

Referring now to FIG. 13, an illustrative sled 1204 includes a processor 1302, a memory 1304, an input/output (I/O) subsystem 1306, data storage 1308, a communication circuit 1310, one or more telemetry sensors 1312, and a baseboard management controller 1314. In some embodiments, one or more of the illustrative components of the sled 1204 may be incorporated in, or otherwise form a portion of, another component. For example, the memory 1304, or portions thereof, may be incorporated in the processor 1302 in some embodiments.

The processor 1302 may be embodied as any type of processor capable of performing the functions described herein. For example, the processor 1302 may be embodied as a single or multi-core processor(s), a single or multi-socket processor, a digital signal processor, a graphics processor, a microcontroller, or other processor or processing/controlling circuit. Similarly, the memory 1304 may be embodied as any type of volatile or non-volatile memory or data storage capable of performing the functions described herein. In operation, the memory 1304 may store various data and software used during operation of the sled 1204 such as operating systems, applications, programs, libraries, and drivers. The memory 1304 is communicatively coupled to the processor 1302 via the I/O subsystem 1306, which may be embodied as circuitry and/or components to facilitate input/output operations with the processor 1302, the memory 1304, and other components of the sled 1204. For example, the I/O subsystem 1306 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 1306 may form a portion of a system-on-a-chip (SoC) and be incorporated, along with the processor 1302, the memory 1304, and other components of the sled 1204 on a single integrated circuit chip.

The data storage 1308 may be embodied as any type of device or devices configured for the short-term or long-term storage of data. For example, the data storage 1308 may include any one or more memory devices and circuits, memory cards, hard disk drives, solid-state drives, or other data storage devices.

The communication circuit 1310 may be embodied as any type of communication circuit, device, or collection thereof, capable of enabling communications between the sled 1204 and other devices. To do so, the communication circuit 1310 may be configured to use any one or more communication technology and associated protocols (e.g., Ethernet, Bluetooth®, Wi-Fi®, WiMAX, near field communication (NFC), etc.) to effect such communication.

The telemetry sensors 1312 may be any sensor capable of being used to determine an operating characteristic of the sled 1204. For example, the telemetry sensors 1312 may include one, some, or all of an air inlet temperature sensor, an air outlet temperature sensor, a processor power sensor, a platform power sensor, etc. In the illustrative embodiment, the platform power sensor senses the power of the entire sled 1204. As noted above, in some embodiments, the components of the sled 1204 may be separated into different physical locations, such as on different racks 1202. In such embodiments, the telemetry sensors 1312 may sense characteristics associated with physically collocated components (such as the total power of the local rack 1202 or the power of a sled (or blade) of the rack 1202) and/or characteristics associated with the sled 1204 that is logically formed from the disparate components. For example, the telemetry sensors 1312 (such as the platform power sensor) may be able to sense the power of all of the components located on the same circuit board, may be able to sense the power of all of the components of the logically formed sled 1204, or both.

The baseboard management controller 1314 may be embodied as any device capable of performing the function described herein. For example, the baseboard management controller 1314 may be embodied as hardware, firmware, or software. The baseboard management controller 1314 is configured to capture sensor data from the telemetry sensors 1312 and to send the sensor data to the data center manager 1208. In the illustrative embodiment, the baseboard management controller 1314 is embodied as hardware capable of communicating with the telemetry sensors 1312 and the data center manager 1208 through an out-of-band channel, i.e. a channel at least partially dedicated to communication related to the functionality of the baseboard management controller 1314. The baseboard management controller 1314 may be compatible with one or more computer interface specifications, such as an Intelligent Platform Management Interface (IPMI). It should be appreciated that, in some embodiments, the functionality of the baseboard management controller 1314, including communication, may be performed independently of the operation of the rest of the sled 1204.

In some embodiments, the sled 1204 may include one or more peripheral devices 1316, such as those commonly found in a compute device. For example, the peripheral devices 1316 may include a keyboard, a mouse, a display, etc.

It should be appreciated that the embodiment of the sled 1204 described in FIG. 13 is not limiting. For example, in some embodiments, the sled 1204 may be embodied as a sled 704 as shown in FIG. 7, a sled 1004 as shown in FIG. 10, or any combination of the sleds 704, 1004, and 1204. Of course, any embodiment of the sled 1204 will include sensors (such as telemetry sensors 1312) if such sensors are necessary to gather the data required for a particular embodiment.

Figure 14:
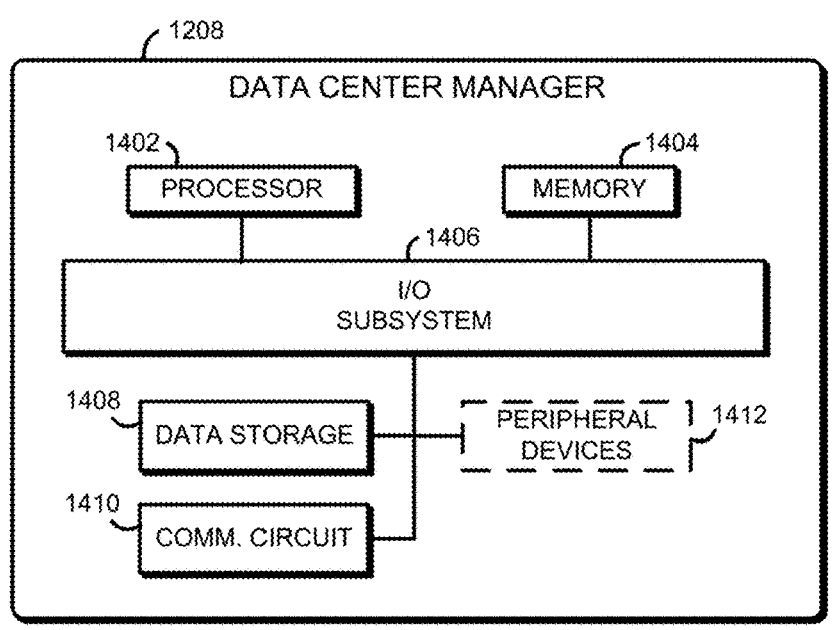
FIG. 14 is a simplified block diagram of at least one embodiment of a data center manager of the data center of FIG. 12.

Referring now to FIG. 14, an illustrative data center manager 1208 includes a processor 1402, a memory 1404, an I/O subsystem 1406, data storage 1408, a communication circuit 1410, and optional peripheral devices 1412. Each of the processor 1402, the memory 1404, the I/O subsystem 1406, the data storage 1408, the communication circuit 1410, and the optional peripheral devices 1412 may be similar to the corresponding components of the sled 1204. As such, the description of those components of the sled 1204 is equally applicable to the description of those components of data center manager 1208 and is not repeated herein for clarity of the description.

Figure 15:
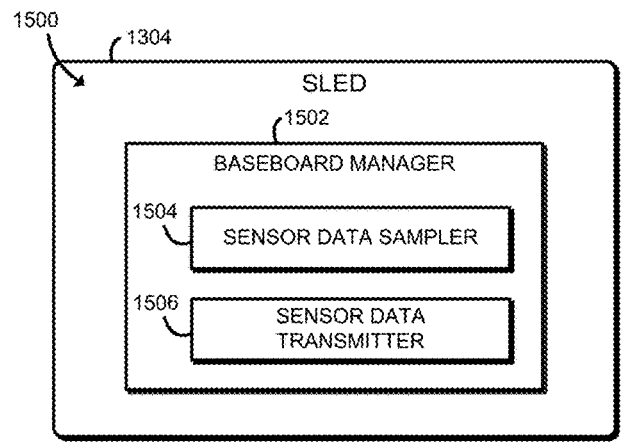
FIG. 15 is a block diagram of at least one embodiment of an environment that may be established by the compute device of FIG. 12.

Referring now to FIG. 15, in use, the sled 1204 may establish an environment 1500. The illustrative environment 1500 includes a baseboard manager 1502. It should be appreciated that, in use, the sled 1204 may include additional components not shown in FIG. 15 to perform computation tasks that may be executed by the sled 1204. The various components of the environment 1500 may be embodied as hardware, firmware, software, or a combination thereof. As such, in some embodiments, one or more of the components of the environment 1500 may be embodied as circuitry or collection of electrical devices (e.g., a baseboard manager circuit 1502). It should be appreciated that, in such embodiments, the baseboard manager 1502 may form a portion of one or more of the processor 1302, the I/O subsystem 1306, the communication circuit 1310, and/or other components of the sled 1204. Additionally, in some embodiments, one or more of the illustrative components may form a portion of another component and/or one or more of the illustrative components may be independent of one another. Further, in some embodiments, one or more of the components of the environment 1500 may be embodied as virtualized hardware components or emulated architecture, which may be established and maintained by the processor 1302 or other components of the sled 1204.

The baseboard manager 1502 includes a sensor data sampler 1504 and a sensor data transmitter 1506. The sensor data sampler 1504 is configured to capture sensor data from the telemetry sensors 1312. The sensor data sampler 1504 may be configured to capture sensor data continually, periodically, or when so requested by another component or device, such as the data center manager 1208. For example, the sensor data sampler 1504 may capture sensor data at least several times a second, once per second, several times per minute, once per minute, etc. The sensor data sampler 1504 may either store the sensor data or immediately send it with the sensor data transmitter 1506. The sensor data sampler 1504 may store the sensor data in the data storage 1308 or in separate data storage of the baseboard management controller 1314.

As used herein, sensor data refers generally to data that is captured by one or more of the telemetry sensors 1312, including data that may be derived by processing the sensor data, such as average values of the sensors. As used herein, a sensor data sample refers to sensor data associated with a particular time, such as sensor data gathered at a particular point in time or gathered over a particular window of time, such as 15 minutes. A given sensor data sample may include data from a single telemetry sensor 1312 or from multiple telemetry sensors 1312. It should be appreciated that sensor data may include several sensor data samples.

The sensor data transmitter 1506 is configured to transmit the sensor data that is captured by the sensor data sampler 1504. In the illustrative embodiment, the sensor data transmitter 1506 sends the sensor data to the data center manager 1208 through an out-of-band communication channel (e.g., a communication channel that does not use the communication circuit 1310). The sensor data transmitter 1506 may be configured to send the sensor data as soon as it is captured, to send data collected over a period of time all at once, or to send data when so requested by another component or device, such as the data center manager 1208.

Figure 16:
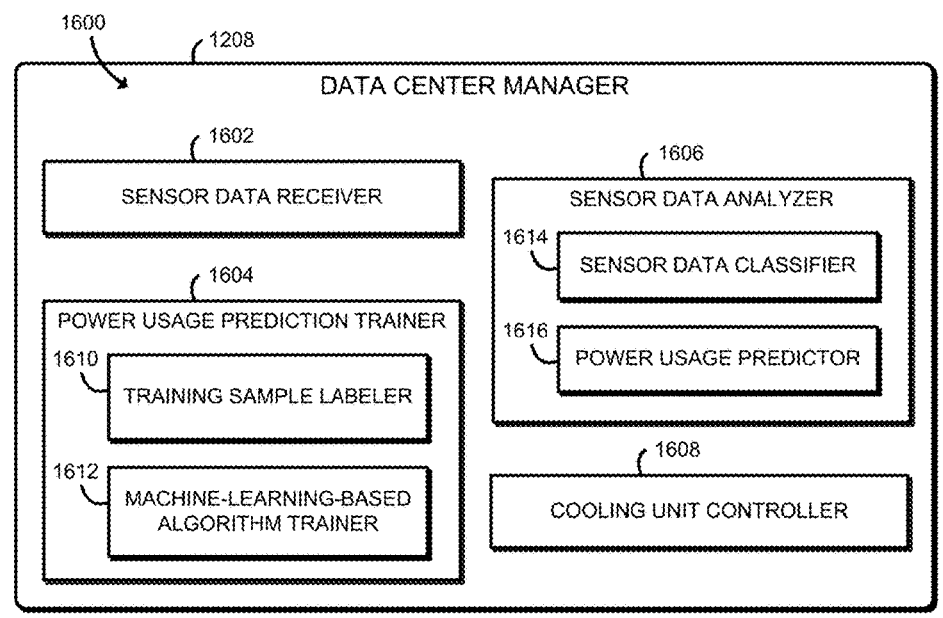
FIG. 16 is a block diagram of at least one embodiment of an environment that may be established by the data center manager of FIG. 12.

Referring now to FIG. 16, in use, the data center manager 1208 may establish an environment 1600. The illustrative environment 1600 includes a sensor data receiver 1602, a power usage prediction trainer 1604, a sensor data analyzer 1606, and a cooling unit controller 1608. The various components of the environment 1600 may be embodied as hardware, firmware, software, or a combination thereof. As such, in some embodiments, one or more of the components of the environment 1600 may be embodied as circuitry or collection of electrical devices (e.g., a sensor data receiver circuit 1602, a power usage prediction trainer circuit 1604, a sensor data analyzer circuit 1606, etc.). It should be appreciated that, in such embodiments, one or more of the sensor data receiver circuit 1602, the power usage prediction trainer circuit 1604, the sensor data analyzer circuit 1606, etc., may form a portion of one or more of the processor 1402, the I/O subsystem 1406, the communication circuit 1410, and/or other components of the data center manager 1208. Additionally, in some embodiments, one or more of the illustrative components may form a portion of another component and/or one or more of the illustrative components may be independent of one another. Further, in some embodiments, one or more of the components of the environment 1600 may be embodied as virtualized hardware components or emulated architecture, which may be established and maintained by the processor 1402 or other components of the data center manager 1608.

The sensor data receiver 1602 is configured to receiver sensor data from one or more of the sleds 1204 of the data center 1200. The sensor data receiver 1602 may receive the sensor data continually, periodically, or when the sensor data receiver 1602 so requests the sensor data.

The power usage prediction trainer 1604 is configured to train a machine-learning-based algorithm to predict the power usage of the data center. The power usage prediction trainer 1604 trains the machine-learning-based algorithm using training sensor data. In the illustrative embodiment, the training sensor data is made up of sensor data received over time by the sensor data receiver 1602. Additionally or alternatively, the power usage prediction trainer 1604 may one or more memory devices acquire sensor training data from another source, such as from another compute device or from the data storage 1408. In such embodiments, the sensor training data may not correspond to the specific data center 1200 that the data center manager 1208 is associated with.

The power usage prediction trainer 1604 includes a training sample labeler 1610 and a machine learning algorithm trainer 1612. Since the number of data points in the sensor data may be impractically high to be used to directly train an algorithm, the sensor data may be pre-processed before being used as training data. For example, the sensor data may be averaged over a period of time, such as 1, 2, 5, 10, 15, 20, or 30 minutes to generate the sensor training data. Additionally, the sensor training data may be further processed or augmented before being used for training, such as by determining the moving average convergence/divergence (MACD) for each sensor data sample of the sensor data. As used herein, MACD of a sensor data sample associated with a telemetry sensor 1312 (e.g., a telemetry sensor 1312 that samples the platform power) includes three signals, (a) a signal that is a difference between a fast exponential moving average of the previous sensor data samples and a slow exponential moving average of the previous sensor data samples, (b) a signal that is an exponential moving average of the signal (a), and (c) a signal that is the difference between the signals (a) and (b). The three time constants used in each of the three exponential moving averages may be any combination of values, such as any combination of more or less than 1, 2, 5, 10, 20, 30, or 45 seconds or 1, 2, 5, 10, 15, 20, 25, or 30 minutes. In the illustrative embodiment, a bias of each sensor data sample may also be determined. As used herein, the bias indicates whether the value of a particular sensor (e.g., platform power sensor) in the time period associated with the sensor data sample has increased or decreased as compared to the value of the particular sensor in the time period associated with the previous sensor data sample. For example, the bias of the platform power may be defined as $Bias_{Platform}=(PlatformPower_{Current})/(PlatformPower_{Previous})-1$, where $PlatformPower_{Current}$ is the average of the power used by the platform in the time period associated with the current sensor data sample (such as the past 15 minutes), and $PlatformPower_{Previous}$ is the average of the power used by the platform in a time period associated with the previous sensor data sample (such as the 15 minutes before the past 15 minutes). If the bias is greater than zero, then the average power associated with the current sensor data sample is greater than the average power associated with the previous sensor data sample, and if the bias is less than zero, then the average power associated with the current sensor data sample is less than the average power associated with the previous sensor data sample. In the illustrative embodiment, the MACD and bias of the platform power is determined for each sensor data sample. Additionally or alternatively, the MACD and bias of other telemetry sensors 1312 may be determined, or no MACD or bias may be determined.

In the illustrative embodiment, the training sample labeler 1610 may label each training sensor data sample as being in one of two classes based on the bias of the platform power of a subsequent (e.g., the next) training sensor data sample (which indicates that the present training sensor data sample is associated with an upcoming increase in power). For example, the bias associated with the next training sensor data sample may be compared to a fixed value, such as 0.01, 0.02, 0.03, 0.04, 0.05, 0.07, 0.1, or 0.15. If the next training sensor data sample bias is above the fixed value, the current training sensor data sample may be labeled as being in a first class, and if it is below the fixed value, the current training sensor data sample may be labeled as being in a second class. The first class may indicate that the training sensor data sample is associated with a significant change in the upcoming power usage pattern of the data center 1200, and the second class may indicate that the training sensor data sample is associated with no significant change in the upcoming power usage pattern of the data center 1200.

It should be appreciated that the approach discussed above for generating and labeling training sensor data is not the only approach that could be used. In particular, the sensor data sample at a given time may generally be labeled by using training sensor data samples associated with a future time. For example, if future sensor data indicates that the power usage has increased over the past five minutes, that sensor data can be used to label the sensor data sample from five minutes ago as being a sensor data sample associated with an upcoming increase in power usage.

In some embodiments, the training sensor data may not be labeled, but may instead remain unlabeled. It should be appreciated that, in such embodiments, the training sampler labeler 1610 may still augmented the sensor data, such as with the MACD and bias, as described above.

The machine learning algorithm trainer 1612 is configured to train a machine-learning-based classification algorithm using the training sensor data to classify sensor data samples into one of two or more classifications, such as by training a support vector machine or a neural network. As a result of training the machine-learning-based algorithm, the machine learning algorithm trainer 1612 determines one or more parameters that characterizes the machine-learning-based algorithm. In some embodiments, the machine learning algorithm trainer 1612 may update the parameters of the machine-learning-based algorithm continuously, continually, periodically, or when so instructed. For example, the machine learning algorithm trainer 1612 may continually update the parameters of the machine-learning-based algorithm every 15 minutes as more sensor data becomes available.

In the illustrative embodiment, the machine learning algorithm trainer 1612 trains a machine-learning-based algorithm using the training sensor data that is labeled by the training sample labeler 1610. As part of the training, the machine algorithm trainer 1612 may update the value against which the bias of the training data is compared and relabel the training data. In some embodiments, such as embodiments in which the training data is unlabeled, the machine learning algorithm trainer 1612 may train the machine-learning-based algorithm in an unsupervised fashion. For example, the machine learning algorithm trainer 1612 may train a support vector clustering algorithm.

The sensor data analyzer 1606 is configured to analyze sensor data including one or more sensor data samples to determine a predicted power usage. The sensor data analyzer 1606 includes a sensor data classifier 1614 and a power usage predictor 1616. The illustrative sensor data classifier 1614 is configured to classify a sensor data sample into one of two or more classifications using the parameters of the machine-learning-based algorithm that was trained in block 1612. It should be appreciated that, in some embodiments, the parameters of the machine-learning-based algorithm that are used to classify the sensor data may be determined by a compute device different from the data center manager 1208, and may even be based on training sensor data not associated with the data center 1200. In the illustrative embodiment, the sensor data analyzer 1606 may determine the sensor data samples based on the received sensor data, such as by averaging the sensor data over a period of time, such as over 1, 2, 5, 10, 15, 20, or 30 minutes or by augmenting sensor data samples to include the MACD and bias, as described above. Additionally or alternatively, the sensor data received by the sensor data receiver 1602 may include the sensor data samples that have already been processed to be averaged and/or augmented with the MACD and bias.

The power usage predictor 1616 is configured to predict a power usage based on the classification of a sensor data sample. In the illustrative embodiment, the classes are a first class, associated with a significant change in the upcoming power usage pattern of the data center 1200, and a second class, associated with no significant change in the upcoming power usage pattern of the data center 1200. If the sensor data sample is in the first class, the power usage predictor 1616 performs a linear regression over a relatively long recent time (such as at least over the past 15, 20, 25, 30, 45 or 60 minutes) of power usage to determine the predicted upcoming power usage. If the sensor data sample is in the second class, the power usage predictor 1616 performs a linear regression using the sensor data from a relatively short recent time (such as less than the past 15, 10, or 5 minutes) and, optionally, using the sensor data from a relatively short time in the future (such as the next 1, 2, 5, or 10 minutes) to determine the predicted upcoming power usage. Of course, in embodiments in which the sensor data from the time in the future is used, the final prediction cannot be made until the sensor data is available, but an intermediate prediction based on the data available may be used in some cases.

Although the embodiment described above first classifies the sensor data sample and then predicts the power usage based on the classification, it should be appreciated that, in some embodiments, the training sensor data may be used to train a machine-learning-based algorithm that directly predicts the upcoming power usage based on the sensor data sample. In such embodiments, there may not be any intermediate classification of the sensor data sample.

The cooling unit controller 1608 is configured to control the cooling unit 1206 based on the predicted upcoming power usage. For example, if the power usage is predicted to significantly increase in more or less than the next 1, 2, 5, 10, or 15 minutes, the cooling unit controller 1608 may increase the heat extraction of the cooling unit 1206, such as by changing the duty cycle, changing a fan speed, changing a coolant flow rate, etc.

Figures 17, 18:
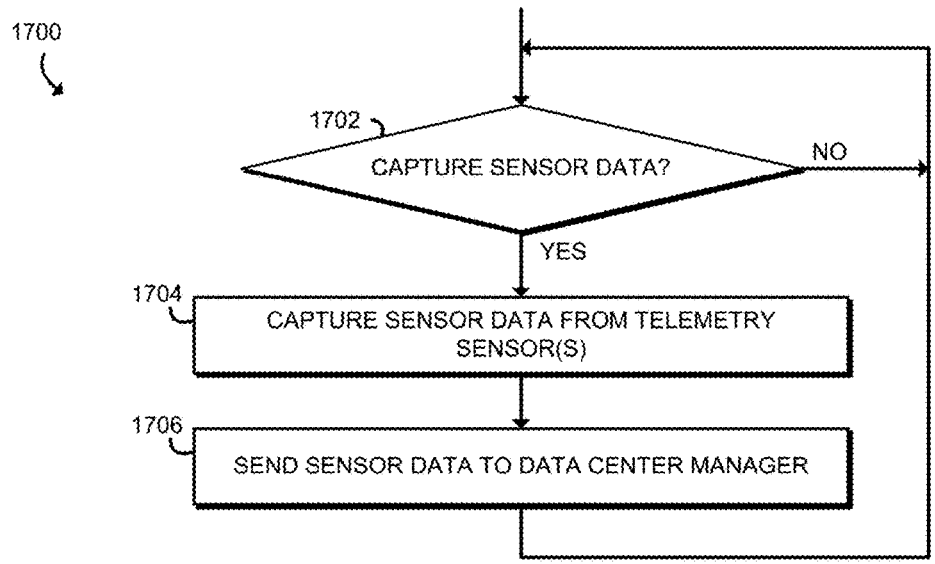
FIG. 17 is a simplified flow diagram of at least one embodiment of a method for capturing sensor data that may be executed by the compute device of FIG. 12.
FIG. 18 is a simplified flow diagram of at least one embodiment of a method for training a machine-learning-based algorithm that may be executed by the data center manager of FIG. 12.

Referring now to FIG. 17, in use, the sled 1204 may execute a method 1700 for capturing sensor data. The method begins in block 1702, in which the sled 1204 decides whether or not to capture sensor data. In some embodiments, the sled 1204 may capture data continuously or continually, while, in other embodiments, the sled 1204 may only do so when a certain condition has been met, such as a certain period of time has passed or the sled 1204 has been so instructed. If the sled 1204 should capture sensor data, the method 1700 proceeds to block 1704. Otherwise, the method 1700 loops back to block 1702.

In block 1704, the sled 1204 captures sensor data from one or more telemetry sensors 1312. In block 1706, the sled 1204 sends the sensor data to the data center manager 1208. The method 1700 then loops back to block 1702.

Referring now to FIG. 18, in use, the data center manager 1208 may execute a method 1800 for training a machine-learning-based algorithm using the sensor data captured from one or more sleds 1204. The method 1800 begins in block 1802, in which the data center manager 1208 gathers sensor data from one or more sleds 1204 for use as training sensor data.

In block 1804, the data center manager 1208 labels the training sensor data, as described above in more detail. For example, the data center manager 1208 may label the training sensor data by determining the bias of training sensor data samples as defined above and compare that to a fixed value. In some embodiments, the data center manager 1208 may average the sensor data to generate the training sensor data samples, and/or may augment a training sensor data with additional data such as the MACD or bias as described above.

In block 1806, the data center manager 1208 trains a machine-learning-based algorithm using the labeled training sensor data. In the illustrative embodiment, the data center manager 1208 trains a support vector machine in block 1810. In other embodiments, the data center manager 1208 may train a different machine-learning-based algorithm in block 1812.

Figure 19:
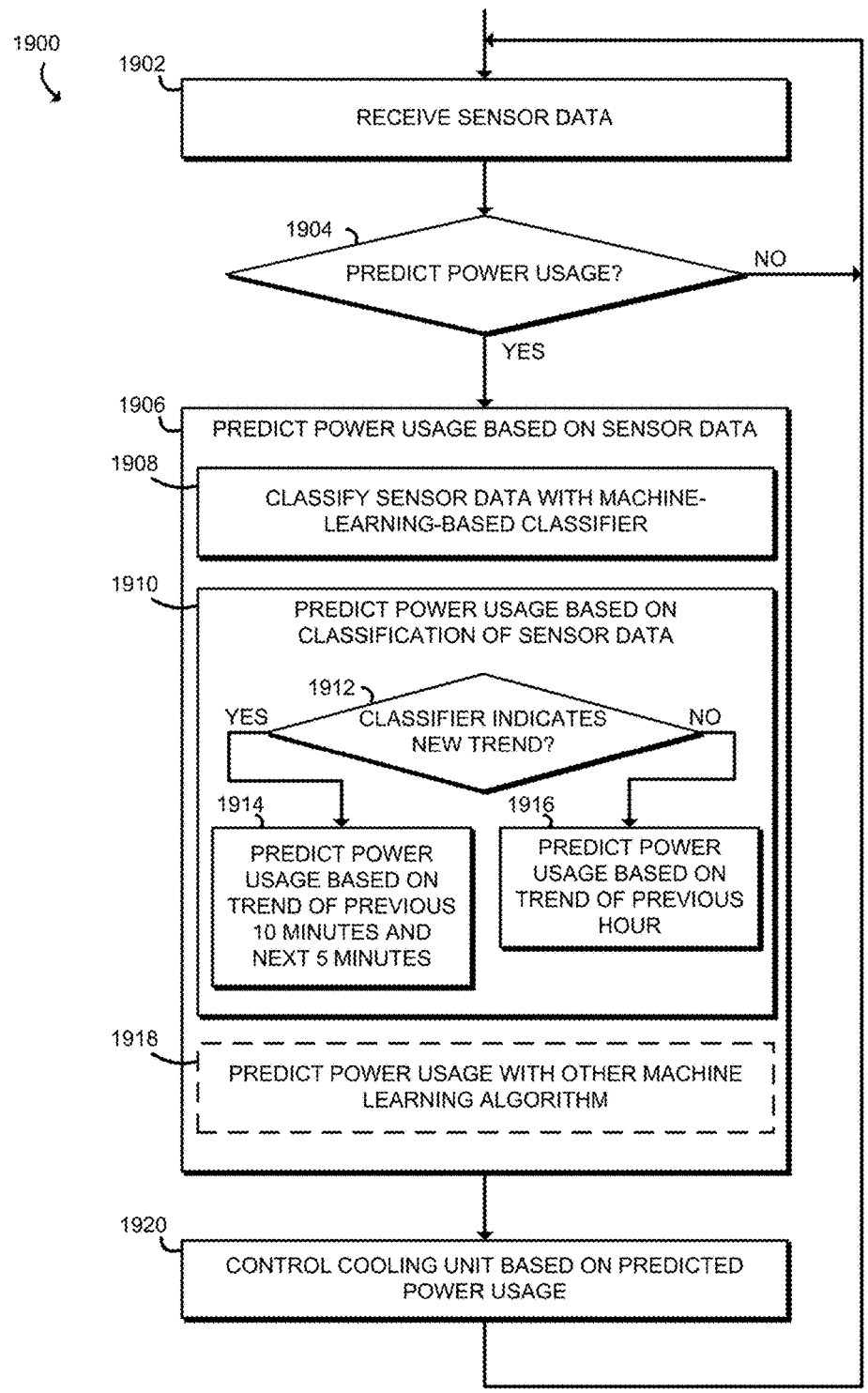
FIG. 19 is a simplified flow diagram of at least one embodiment of a method for predicting the power usage of the data center of FIG. 12 that may be executed by the data center manager of FIG. 12.

Referring now to FIG. 19, in use, the data center manager 1208 may execute a method 1900 for predicting a power usage of the data center 1200 based on sensor data. The method begins in block 1902, in which the data center manager 1208 receives sensor data from one or more sleds 1204.

In block 1904, the data center manager 1208 decides whether or not to predict the power usage of the data center 1200. The data center manager 1208 may only predict the power usage of the data center 1200 periodically, such as every 1, 2, 5, 10, 15, 20 or 25 minutes, and so if that amount of time has not yet passed since the last prediction, the method 1900 may loop back to block 1902. Otherwise, if the data center manager 1208 has decided to predict the power usage of the data center 1200, the method 1900 proceeds to block 1906.

In block 1906, the data center manager 1208 predicts the power usage based on the sensor data. In block 1908, the data center manager 1208 predicts the power usage using a machine-learning-based classifier such as a support vector machine by classifying a sensor data sample into one of two or more classes. In some embodiments, the data center manager 1208 may average the sensor data to generate the sensor data sample prior to classifying it, and/or may augment the sensor data sample with additional data such as the MACD and/or a bias, as described above in more detail.

In block 1910, the data center manager 1208 predicts the power usage based on the classification of the sensor data sample. In block 1912, if the classification indicates a new trend of the power usage pattern, the method 1900 proceeds to block 1914. In block 1914, the data center manager 1208 predicts the power usage of the data center 1200 based on a trend of the sensor data (such as platform power used) over a relatively short period of time (such as less than the past 15, 10, or 5 minutes) and, optionally, using the sensor data (such as platform power used) from a relatively short time in the future (such as at least the next 1, 2, 5, or 10 minutes).

Referring back to block 1912, if the classification indicates that a trend of the power usage pattern has not changed, the method 1900 proceeds to block 1916. In block 1916, the data center manager predicts the power usage of the data center 1200 based on a trend of the sensor data (such as the platform power used) over a relatively long recent time (such as at least over the past 15, 20, 25, 30, 45 or 60 minutes).

In some embodiments, in block 1918, the data center manager 1208 may predict the power usage based on the sensor data sample with a different machine-learning-based algorithm, such as by directly predicting the power usage based on a neural network. In such embodiments, there may not be an explicit classification of the sensor data sample as described in block 1908.

In block 1920, the data center manager 1208 controls the cooling unit 1206 based on the predicted power usage. For example, if the power usage is predicted to increase, the data center manager 1208 may adjust the cooling unit 1206 to extract more heat from the data center 1200, and if the power usage is predicted to decrease, the data center manager 1208 may adjust the cooling unit 1206 to extract less heat from the data center 1200.

It should be appreciated that, in some embodiments, a different machine-learning-based algorithm may be trained and used for each sled 1204. In such embodiments, averaging of the predicted power usage may be done on a rack-by-rack basis, a row-by-row basis, or over the entire data center 1200. In some embodiments, the sensor data may be averaged or otherwise aggregated before training and/or before using the machine-learning-based algorithm on a rack-by-rack basis, a row-by-row basis, or over the entire data center 1200. In some embodiments, the cooling unit

1206 may have different zones that can be controlled independently, and a machine-learning-based algorithm may be used to predict power usage and control the cooling of each different zone independently.

EXAMPLES

Illustrative examples of the devices, systems, and methods disclosed herein are provided below. An embodiment of the devices, systems, and methods may include any one or more, and any combination of, the examples described below.

Example 1 includes a data center manager for prediction of power usage of a data center, the data center manager comprising one or more processors; one or more memory devices having stored therein a plurality of instructions that, when executed by the one or more processors, causes the data center manager to receive sensor data from one or more sensors from one or more sleds of the data center; acquire one or more sensor data samples based on the sensor data; acquire one or more parameters of a machine-learning-based algorithm; predict, based on the one or more sensor data samples, a future power usage of the data center with use of the one or more parameters of the machine-learning-based algorithm; and control at least one cooling unit of the data center based on the predicted future power usage.

Example 2 includes the subject matter of Example 1, and wherein to acquire one or more sensor data samples based on the sensor data comprises to average, for each of the one or more sensors, the corresponding sensor data over a period of time; calculate, for at least one sensor of the one or more sensors, a moving average convergence/divergence (MACD) of the corresponding sensor data; calculate, for at least one sensor of the one or more sensors, a bias of the corresponding sensor data; and generate the one or more sensor data samples based on the averaged sensor data, the MACD of the sensor data, and the bias of the sensor data.

Example 3 includes the subject matter of any of Examples 1 and 2, and wherein the sensor data comprises data from each of a plurality of sleds of the data center, wherein to acquire the one or more sensor data samples comprises to average, for each sensor type of the one or more sensors, the sensor data from the plurality of sleds.

Example 4 includes the subject matter of any of Examples 1-3, and wherein the sensor data comprises the one or more sensor data samples.

Example 5 includes the subject matter of any of Examples 1-4, and wherein the plurality of instructions further causes the data center manager to acquire a plurality of training sensor data samples; label each training sensor data sample of the plurality of training sensor data samples to be in a class of a plurality of classes; and train, with use of the plurality of labeled training sensor data samples, the machine-learning-based algorithm to generate the one or more parameters.

Example 6 includes the subject matter of any of Examples 1-5, and wherein to label each training sensor data sample to be in a class of the plurality of classes comprises to, for each training sensor data sample of the plurality of training sensor data samples determine a bias of a training sensor data sample that is subsequent to the corresponding training sensor data sample; compare the bias to a fixed value; label, if the bias is greater than the fixed value, the corresponding training sensor data sample to be in a first class of the plurality of classes; and label, if the bias is less than or equal to the fixed value, the corresponding training sensor data sample to be in a second class of the plurality of classes.

Example 7 includes the subject matter of any of Examples 1-6, and wherein to predict the future power usage comprises to classify, with use of the machine-learning-based algorithm, a sensor data sample of the one or more sensor data samples into a first class or a second class; predict, if the sensor data sample is classified into the first class, the future power usage based on the power usage of a first period of time associated with the first class; and predict, if the sensor data sample is classified into the second class, the future power usage based on the power usage of a second period of time associated with the second class and shorter than the first period of time.

Example 8 includes the subject matter of any of Examples 1-7, and wherein to predict the future power usage based on the power usage in the first period of time comprises to predict the future power usage based on the power usage over the previous hour and wherein to predict the future power usage based on the power usage in the second period of time comprises to predict the future power usage based on the power usage over the previous fifteen minutes.

Example 9 includes the subject matter of any of Examples 1-8, and wherein to predict the future power usage based on the power usage in the second period of time comprises to predict the future power usage based on the power usage over the previous fifteen minutes and based on the power usage over the next five minutes.

Example 10 includes the subject matter of any of Examples 1-9, and wherein the one or more sensors comprise one or more of an intake air temperature sensor, an exhaust temperature sensor, a platform power sensor, and a processor power sensor.

Example 11 includes a method for predicting power usage of a data center by a data center manager, the method comprising receiving, by the data center manager, sensor data from one or more sensors from one or more sleds of the data center; acquiring, by the data center manager, one or more sensor data samples based on the sensor data; acquiring, by the data center manager, one or more parameters of a machine-learning-based algorithm; predicting, by the data center manager and based on the one or more sensor data samples, a future power usage of the data center with use of the one or more parameters of the machine-learning-based algorithm; and controlling, by the data center manager, at least one cooling unit of the data center based on the predicted future power usage.

Example 12 includes the subject matter of Example 11, and wherein acquiring one or more sensor data samples based on the sensor data comprises averaging, for each of the one or more sensors, the corresponding sensor data over a period of time; calculating, for at least one sensor of the one or more sensors, a moving average convergence/divergence (MACD) of the corresponding sensor data; calculating, for at least one sensor of the one or more sensors, a bias of the corresponding sensor data; and generating the one or more sensor data samples based on the averaged sensor data, the MACD of the sensor data, and the bias of the sensor data.

Example 13 includes the subject matter of any of Examples 11 and 12, and wherein the sensor data comprises data from each of a plurality of sleds of the data center, wherein acquiring the one or more sensor data samples comprises averaging, for each sensor type of the one or more sensors, the sensor data from the plurality of sleds.

Example 14 includes the subject matter of any of Examples 11-13, and wherein the sensor data comprises the one or more sensor data samples.

Example 15 includes the subject matter of any of Examples 11-14, and further including acquiring, by the data center manager, a plurality of training sensor data samples; labeling, by the data center manager, each training sensor data sample of the plurality of training sensor data samples to be in a class of a plurality of classes; and training, by the data center manager and with use of the plurality of labeled training sensor data samples, the machine-learning-based algorithm to generate the one or more parameters.

Example 16 includes the subject matter of any of Examples 11-15, and wherein labeling each training sensor data sample to be in a class of the plurality of classes comprises, for each training sensor data sample of the plurality of training sensor data samples determining a bias of a training sensor data sample that is subsequent to the corresponding training sensor data sample; comparing the bias to a fixed value; labeling, if the bias is greater than the fixed value, the corresponding training sensor data sample to be in a first class of the plurality of classes; and labeling, if the bias is less than or equal to the fixed value, the corresponding training sensor data sample to be in a second class of the plurality of classes.

Example 17 includes the subject matter of any of Examples 11-16, and wherein predicting the future power usage comprises classifying, with use of the machine-learning-based algorithm, a sensor data sample of the one or more sensor data samples into a first class or a second class; predicting, if the sensor data sample is classified into the first class, the future power usage based on the power usage of a first period of time associated with the first class; and predicting, if the sensor data sample is classified into the second class, the future power usage based on the power usage of a second period of time associated with the second class and shorter than the first period of time.

Example 18 includes the subject matter of any of Examples 11-17, and wherein predicting the future power usage based on the power usage in the first period of time comprises predicting the future power usage based on the power usage over the previous hour and wherein predicting the future power usage based on the power usage in the second period of time comprises predicting the future power usage based on the power usage over the previous fifteen minutes.

Example 19 includes the subject matter of any of Examples 11-18, and wherein predicting the future power usage based on the power usage in the second period of time comprises predicting the future power usage based on the power usage over the previous fifteen minutes and based on the power usage over the next five minutes.

Example 20 includes the subject matter of any of Examples 11-19, and wherein the one or more sensors comprise one or more of an intake air temperature sensor, an exhaust temperature sensor, a platform power sensor, and a processor power sensor.

Example 21 includes one or more computer-readable media comprising a plurality of instructions stored thereon that, when executed, causes a compute device to perform the method of any of Examples 11-20.

Example 22 includes a compute device for prediction of power usage of a data center, the compute device comprising means for performing the method of any of Examples 11-20.

Example 23 includes a data center manager for prediction of power usage of a data center, the data center manager comprising means for receiving sensor data from one or more sensors from one or more sleds of the data center; means for acquiring one or more sensor data samples based on the sensor data; means for acquiring one or more parameters of a machine-learning-based algorithm; means for predicting, based on the one or more sensor data samples, a future power usage of the data center with use of the one or more parameters of the machine-learning-based algorithm; and means for controlling at least one cooling unit of the data center based on the predicted future power usage.

Example 24 includes the subject matter of Example 23, and wherein the means for acquiring one or more sensor data samples based on the sensor data comprises means for averaging, for each of the one or more sensors, the corresponding sensor data over a period of time; means for calculating, for at least one sensor of the one or more sensors, a moving average convergence/divergence (MACD) of the corresponding sensor data; means for calculating, for at least one sensor of the one or more sensors, a bias of the corresponding sensor data; and means for generating the one or more sensor data samples based on the averaged sensor data, the MACD of the sensor data, and the bias of the sensor data.

Example 25 includes the subject matter of any of Examples 23 and 24, and wherein the sensor data comprises data from each of a plurality of sleds of the data center, wherein the means for acquiring the one or more sensor data samples comprises means for averaging, for each sensor type of the one or more sensors, the sensor data from the plurality of sleds.

Example 26 includes the subject matter of any of Examples 23-25, and wherein the sensor data comprises the one or more sensor data samples.

Example 27 includes the subject matter of any of Examples 23-26, and further including means for acquiring a plurality of training sensor data samples; means for labeling each training sensor data sample of the plurality of training sensor data samples to be in a class of a plurality of classes; and means for training, with use of the plurality of labeled training sensor data samples, the machine-learning-based algorithm to generate the one or more parameters.

Example 28 includes the subject matter of any of Examples 23-27, and wherein means for labeling each training sensor data sample to be in a class of the plurality of classes comprises, for each training sensor data sample of the plurality of training sensor data samples means for determining a bias of a training sensor data sample that is subsequent to the corresponding training sensor data sample; means for comparing the bias to a fixed value; means for labeling, if the bias is greater than the fixed value, the corresponding training sensor data sample to be in a first class of the plurality of classes; and means for labeling, if the bias is less than or equal to the fixed value, the corresponding training sensor data sample to be in a second class of the plurality of classes.

Example 29 includes the subject matter of any of Examples 23-28, and wherein the means for predicting the future power usage comprises means for classifying, with use of the machine-learning-based algorithm, a sensor data sample of the one or more sensor data samples into a first class or a second class; means for predicting, if the sensor data sample is classified into the first class, the future power usage based on the power usage of a first period of time associated with the first class; and means for predicting, if the sensor data sample is classified into the second class, the future power usage based on the power usage of a second period of time associated with the second class and shorter than the first period of time.

Example 30 includes the subject matter of any of Examples 23-29, and wherein the means for predicting the future power usage based on the power usage in the first period of time comprises means for predicting the future power usage based on the power usage over the previous hour and wherein the means for predicting the future power usage based on the power usage in the second period of time comprises means for predicting the future power usage based on the power usage over the previous fifteen minutes.

Example 31 includes the subject matter of any of Examples 23-30, and wherein the means for predicting the future power usage based on the power usage in the second period of time comprises means for predicting the future power usage based on the power usage over the previous fifteen minutes and based on the power usage over the next five minutes.

Example 32 includes the subject matter of any of Examples 23-31, and wherein the one or more sensors comprise one or more of an intake air temperature sensor, an exhaust temperature sensor, a platform power sensor, and a processor power sensor.

The invention claimed is:

1. A data center manager for prediction of power usage of a data center, the data center manager comprising:
one or more processors;
one or more memory devices having stored therein a plurality of instructions that, when executed by the one or more processors, causes the data center manager to:
receive sensor data from one or more sensors from one or more sleds of the data center;
acquire one or more sensor data samples based on the sensor data;
acquire one or more parameters of a machine-learning-based algorithm;
predict, based on the one or more sensor data samples, a future power usage of a current workload of the data center with use of the one or more parameters of the machine-learning-based algorithm, wherein the future power usage of the current workload is different from a current power usage of the current workload; and
control at least one cooling unit of the data center based on the predicted future power usage.

2. The data center manager of claim 1, wherein to acquire one or more sensor data samples based on the sensor data comprises to:
average, for each of the one or more sensors, the corresponding sensor data over a period of time;
calculate, for at least one sensor of the one or more sensors, a moving average convergence/divergence (MACD) of the corresponding sensor data;
calculate, for at least one sensor of the one or more sensors, a bias of the corresponding sensor data; and
generate the one or more sensor data samples based on the averaged sensor data, the MACD of the sensor data, and the bias of the sensor data.

3. The data center manager of claim 1, wherein the plurality of instructions further causes the data center manager to:
acquire a plurality of training sensor data samples;
label each training sensor data sample of the plurality of training sensor data samples to be in a class of a plurality of classes; and
train, with use of the plurality of labeled training sensor data samples, the machine-learning-based algorithm to generate the one or more parameters.

4. The data center manager of claim 3, wherein to label each training sensor data sample to be in a class of the plurality of classes comprises to, for each training sensor data sample of the plurality of training sensor data samples:
determine a bias of a training sensor data sample that is subsequent to the corresponding training sensor data sample;
compare the bias to a fixed value;
label, if the bias is greater than the fixed value, the corresponding training sensor data sample to be in a first class of the plurality of classes; and
label, if the bias is less than or equal to the fixed value, the corresponding training sensor data sample to be in a second class of the plurality of classes.

5. The data center manager of claim 1, wherein to predict the future power usage comprises to:
classify, with use of the machine-learning-based algorithm, a sensor data sample of the one or more sensor data samples into a first class or a second class;
predict, if the sensor data sample is classified into the first class, the future power usage based on the power usage of a first period of time associated with the first class; and
predict, if the sensor data sample is classified into the second class, the future power usage based on the power usage of a second period of time associated with the second class and shorter than the first period of time.

6. The data center manager of claim 5, wherein to predict the future power usage based on the power usage in the first period of time comprises to predict the future power usage based on the power usage over the previous hour and wherein to predict the future power usage based on the power usage in the second period of time comprises to predict the future power usage based on the power usage over the previous fifteen minutes.

7. The data center manager of claim 1, wherein the one or more sensors comprise one or more of an intake air temperature sensor, an exhaust temperature sensor, a platform power sensor, and a processor power sensor.

8. A method for predicting power usage of a data center by a data center manager, the method comprising:
receiving, by the data center manager, sensor data from one or more sensors from one or more sleds of the data center;
acquiring, by the data center manager, one or more sensor data samples based on the sensor data;
acquiring, by the data center manager, one or more parameters of a machine-learning-based algorithm;
predicting, by the data center manager and based on the one or more sensor data samples, a future power usage of the data center with use of the one or more parameters of the machine-learning-based algorithm; and
controlling, by the data center manager, at least one cooling unit of the data center based on the predicted future power usage.

9. The method of claim 8, wherein acquiring one or more sensor data samples based on the sensor data comprises:
averaging, for each of the one or more sensors, the corresponding sensor data over a period of time;
calculating, for at least one sensor of the one or more sensors, a moving average convergence/divergence (MACD) of the corresponding sensor data;
calculating, for at least one sensor of the one or more sensors, a bias of the corresponding sensor data; and
generating the one or more sensor data samples based on the averaged sensor data, the MACD of the sensor data, and the bias of the sensor data.

10. The method of claim 8, further comprising:
acquiring, by the data center manager, a plurality of training sensor data samples;

labeling, by the data center manager, each training sensor data sample of the plurality of training sensor data samples to be in a class of a plurality of classes; and training, by the data center manager and with use of the plurality of labeled training sensor data samples, the machine-learning-based algorithm to generate the one or more parameters.

11. The method of claim 10, wherein labeling each training sensor data sample to be in a class of the plurality of classes comprises, for each training sensor data sample of the plurality of training sensor data samples:

determining a bias of a training sensor data sample that is subsequent to the corresponding training sensor data sample;

comparing the bias to a fixed value;

labeling, if the bias is greater than the fixed value, the corresponding training sensor data sample to be in a first class of the plurality of classes; and labeling, if the bias is less than or equal to the fixed value, the corresponding training sensor data sample to be in a second class of the plurality of classes.

12. The method of claim 8, wherein predicting the future power usage comprises:

classifying, with use of the machine-learning-based algorithm, a sensor data sample of the one or more sensor data samples into a first class or a second class;

predicting, if the sensor data sample is classified into the first class, the future power usage based on the power usage of a first period of time associated with the first class; and predicting, if the sensor data sample is classified into the second class, the future power usage based on the power usage of a second period of time associated with the second class and shorter than the first period of time.

13. The method of claim 8, wherein the one or more sensors comprise one or more of an intake air temperature sensor, an exhaust temperature sensor, a platform power sensor, and a processor power sensor.

14. One or more non-transitory computer-readable media comprising a plurality of instructions stored thereon that, when executed, causes a data center manager to:

receive sensor data from one or more sensors from one or more sleds of a data center;

acquire one or more sensor data samples based on the sensor data;

acquire one or more parameters of a machine-learning-based algorithm;

predict, based on the one or more sensor data samples, a future power usage of a current workload of the data center with use of the one or more parameters of the machine-learning-based algorithm, wherein the future power usage of the current workload is different from a current power usage of the current workload; and control at least one cooling unit of the data center based on the predicted future power usage.

15. The one or more non-transitory computer-readable media of claim 14, wherein to acquire one or more sensor data samples based on the sensor data comprises to:

average, for each of the one or more sensors, the corresponding sensor data over a period of time;

calculate, for at least one sensor of the one or more sensors, a moving average convergence/divergence (MACD) of the corresponding sensor data;

calculate, for at least one sensor of the one or more sensors, a bias of the corresponding sensor data; and generate the one or more sensor data samples based on the averaged sensor data, the MACD of the sensor data, and the bias of the sensor data.

16. The one or more non-transitory computer-readable media of claim 14, wherein the plurality of instructions further causes the data center manager to:

acquire a plurality of training sensor data samples;

label each training sensor data sample of the plurality of training sensor data samples to be in a class of a plurality of classes; and train, with use of the plurality of labeled training sensor data samples, the machine-learning-based algorithm to generate the one or more parameters.

17. The one or more non-transitory computer-readable media of claim 16, wherein to label each training sensor data sample to be in a class of the plurality of classes comprises to, for each training sensor data sample of the plurality of training sensor data samples:

determine a bias of a training sensor data sample that is subsequent to the corresponding training sensor data sample;

compare the bias to a fixed value;

label, if the bias is greater than the fixed value, the corresponding training sensor data sample to be in a first class of the plurality of classes; and label, if the bias is less than or equal to the fixed value, the corresponding training sensor data sample to be in a second class of the plurality of classes.

18. The one or more non-transitory computer-readable media of claim 14, wherein to predict the future power usage comprises to:

classify, with use of the machine-learning-based algorithm, a sensor data sample of the one or more sensor data samples into a first class or a second class;

predict, if the sensor data sample is classified into the first class, the future power usage based on the power usage of a first period of time associated with the first class; and predict, if the sensor data sample is classified into the second class, the future power usage based on the power usage of a second period of time associated with the second class and shorter than the first period of time.

19. The one or more non-transitory computer-readable media of claim 14, wherein the one or more sensors comprise one or more of an intake air temperature sensor, an exhaust temperature sensor, a platform power sensor, and a processor power sensor.

20. A data center manager for prediction of power usage of a data center, the data center manager comprising:

circuitry for receiving sensor data from one or more sensors from one or more sleds of the data center;

means for acquiring one or more sensor data samples based on the sensor data;

circuitry for acquiring one or more parameters of a machine-learning-based algorithm;

means for predicting, based on the one or more sensor data samples, a future power usage of a current workload of the data center with use of the one or more parameters of the machine-learning-based algorithm, wherein the future power usage of the current workload is different from a current power usage of the current workload; and means for controlling at least one cooling unit of the data center based on the predicted future power usage.

21. The data center manager of claim 20, wherein the means for acquiring one or more sensor data samples based on the sensor data comprises:
- means for averaging, for each of the one or more sensors, the corresponding sensor data over a period of time;
- means for calculating, for at least one sensor of the one or more sensors, a moving average convergence/divergence (MACD) of the corresponding sensor data;
- means for calculating, for at least one sensor of the one or more sensors, a bias of the corresponding sensor data; and
- means for generating the one or more sensor data samples based on the averaged sensor data, the MACD of the sensor data, and the bias of the sensor data.

22. The data center manager of claim 20, further comprising:
- means for acquiring a plurality of training sensor data samples;
- means for labeling each training sensor data sample of the plurality of training sensor data samples to be in a class of a plurality of classes; and
- means for training, with use of the plurality of labeled training sensor data samples, the machine-learning-based algorithm to generate the one or more parameters.

23. The data center manager of claim 22, wherein the means for labeling each training sensor data sample to be in a class of the plurality of classes comprises, for each training sensor data sample of the plurality of training sensor data samples:
- means for determining a bias of a training sensor data sample that is subsequent to the corresponding training sensor data sample;
- means for comparing the bias to a fixed value;
- means for labeling, if the bias is greater than the fixed value, the corresponding training sensor data sample to be in a first class of the plurality of classes; and
- means for labeling, if the bias is less than or equal to the fixed value, the corresponding training sensor data sample to be in a second class of the plurality of classes.

24. The data center manager of claim 20, wherein the means for predicting the future power usage comprises:
- means for classifying, with use of the machine-learning-based algorithm, a sensor data sample of the one or more sensor data samples into a first class or a second class;
- means for predicting, if the sensor data sample is classified into the first class, the future power usage based on the power usage of a first period of time associated with the first class; and
- means for predicting, if the sensor data sample is classified into the second class, the future power usage based on the power usage of a second period of time associated with the second class and shorter than the first period of time.

25. The data center manager of claim 20, wherein the one or more sensors comprise one or more of an intake air temperature sensor, an exhaust temperature sensor, a platform power sensor, and a processor power sensor.

* * * * *